US011953606B2

(12) United States Patent
Hu et al.

(10) Patent No.: US 11,953,606 B2
(45) Date of Patent: Apr. 9, 2024

(54) PREPROCESSING MODULE OF GNSS CHIP AND TERMINAL DEVICE

(71) Applicant: Huawei Technologies Co., Ltd., Shenzhen (CN)

(72) Inventors: Rui Hu, Dongguan (CN); Meiwen Yang, Dongguan (CN); Jianqiang Wang, Shenzhen (CN); Lidan Li, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 347 days.

(21) Appl. No.: 17/606,513

(22) PCT Filed: Apr. 21, 2020

(86) PCT No.: PCT/CN2020/085746
§ 371 (c)(1),
(2) Date: Oct. 26, 2021

(87) PCT Pub. No.: WO2020/216197
PCT Pub. Date: Oct. 29, 2020

(65) Prior Publication Data
US 2022/0214460 A1    Jul. 7, 2022

(30) Foreign Application Priority Data
Apr. 26, 2019    (CN) .......................... 201910342537.9

(51) Int. Cl.
*G01S 19/31* (2010.01)
*G01S 19/11* (2010.01)
*G01S 19/28* (2010.01)

(52) U.S. Cl.
CPC ............. *G01S 19/31* (2013.01); *G01S 19/115* (2019.08); *G01S 19/28* (2013.01)

(58) Field of Classification Search
CPC ......... G01S 19/31; G01S 19/115; G01S 19/28
(Continued)

(56) References Cited

U.S. PATENT DOCUMENTS

2007/0298714 A1    12/2007    Chiu
2011/0012783 A1    1/2011     Zhodzishsky et al.
(Continued)

FOREIGN PATENT DOCUMENTS

CN    104618527 A    5/2015
CN    105099476 A    11/2015
(Continued)

*Primary Examiner* — Bo Fan
(74) *Attorney, Agent, or Firm* — Conley Rose, P.C.

(57) ABSTRACT

A preprocessing system includes a first port, where one end of the first port is coupled to a first switch, and the other end of the first port is suspended, where the first switch has a connecting end configured to couple to a first interface and is configured to connect a filter and the first interface, a second port configured to receive a first signal or a second signal, where the filter is configured to filter the first signal to obtain a first positioning signal and a second positioning signal, provide the first positioning signal for the first switch, and provide the second positioning signal for a second interface of a global navigation satellite system (GNSS) chip to adapt to a plurality of antenna configuration types and to achieve universality.

20 Claims, 9 Drawing Sheets

(58) Field of Classification Search
USPC ......... 342/357.22, 357.27, 357.77, 423, 445, 342/455
See application file for complete search history.

(56) References Cited

U.S. PATENT DOCUMENTS

| | | | |
|---|---|---|---|
| 2014/0043184 A1 | 2/2014 | Malaga | |
| 2016/0036519 A1* | 2/2016 | Loomis | G01S 19/41 370/316 |
| 2018/0034136 A1* | 2/2018 | Erentok | H01Q 1/273 |

FOREIGN PATENT DOCUMENTS

| | | |
|---|---|---|
| CN | 105512065 A | 4/2016 |
| CN | 105929422 A | 9/2016 |
| CN | 106788576 A | 5/2017 |
| CN | 107831506 A | 3/2018 |
| CN | 108494443 A | 9/2018 |
| CN | 109547054 A | 3/2019 |
| CN | 110212939 A | 9/2019 |

\* cited by examiner

PREPROCESSING MODULE OF GNSS CHIP AND TERMINAL DEVICE

CROSS-REFERENCE TO RELATED APPLICATIONS

This is a U.S. National Stage of International Patent Application No. PCT/CN2020/085746 filed on Apr. 21, 2020, which claims priority to Chinese Patent Application No. 201910342537.9 filed on Apr. 26, 2019. Both of the aforementioned applications are hereby incorporated by reference in their entireties.

TECHNICAL FIELD

This application relates to the field of GNSS chip technologies, and in particular, to a preprocessing module of a GNSS chip and a terminal device.

BACKGROUND

As a mobile positioning technology develops, a global navigation satellite system (global navigation satellite system) chip is increasingly widely applied.

The GNSS chip may be applied to a plurality of terminal devices having a positioning function, and different terminal devices may have different types of antenna configurations. Therefore, a preprocessing module usually needs to be added between an antenna and the GNSS chip, so that different types of antennas can adapt to the GNSS chip.

However, currently, antenna configuration types are diverse. When a terminal device is developed, a preprocessing module needs to be specially designed based on an antenna configuration type of the terminal device, to enable an antenna of the terminal device to adapt to the GNSS chip. Consequently, development costs of the terminal device are increased.

SUMMARY

Embodiments of this application provide a preprocessing module of a GNSS chip and a terminal device, to enable an antenna of the terminal device to adapt to the GNSS chip.

According to a first aspect, an embodiment of this application provides a preprocessing module of a GNSS chip. The module includes: a first port, a second port, a filter unit, and a first switch unit. One end of the first port is connected to the first switch unit, and the other end of the first port is suspended, or the other end of the first port is configured to connect to a first antenna of a terminal device, and the first antenna is configured to receive a first positioning signal in a first frequency band. The first switch unit is connected to the filter unit, the first switch unit has a connecting end configured to connect to a first interface, where the first interface is an interface corresponding to the first frequency band in the GNSS chip, and the first switch unit is configured to: connect the first port and the first interface when the other end of the first port is connected to the first antenna of the terminal device, or connect the filter unit and the first interface when the other end of the first port is suspended. One end of the second port is connected to the filter unit, the other end of the second port is configured to connect to a second antenna of the terminal device, and the second antenna is configured to: receive a first signal including the first positioning signal in the first frequency band and a second positioning signal in a second frequency band when the other end of the first port is suspended, or receive a second signal including the second positioning signal when the other end of the first port is connected to the first antenna of the terminal device. The filter unit has a connecting end configured to connect to a second interface, where the second interface is an interface corresponding to the second frequency band in the GNSS chip, and the filter unit is configured to: filter the first signal when the other end of the first port is suspended, to obtain the first positioning signal and the second positioning signal, provide the first positioning signal for the first switch unit, and provide the second positioning signal for the second interface of the GNSS chip, or provide the second positioning signal in the second signal for the second interface when the other end of the first port is connected to the first antenna of the terminal device.

A GNSS chip is usually disposed inside the terminal device, for example, a mobile phone, to implement a navigation or positioning function. The preprocessing module provided in this embodiment of this application may be usually disposed between an antenna of the terminal device and the GNSS chip. When one antenna is disposed in the terminal device, the other end of the first port in the preprocessing module may be suspended, and the first switch unit connects the filter unit and the first interface, so that the filter unit can filter a hybrid signal received by the antenna, to obtain a first positioning signal and a second positioning signal in the hybrid signal, and provide the first positioning signal for the first interface by using the first switch unit, and provide the second positioning signal for the second interface, so that adaptation between the antenna and the GNSS chip is implemented. When two antennas are disposed in the terminal device, the other end of the first port in the preprocessing module may be connected to a corresponding antenna, the first switch unit connects the first port and the first interface, to provide the first positioning signal for the first interface through the first port, and the filter unit provides the second positioning signal for the second interface, so that adaptation between the antenna and the GNSS chip can be implemented. It can be learned that, in this embodiment of this application, adaptation between the antenna of the terminal device and the GNSS chip can be implemented, requirements for configurations of different quantities of antennas can be met, and relatively high universality is achieved.

In a possible implementation, the preprocessing module provided in this embodiment of this application further includes a control unit. The control unit is connected to the first switch unit, and is configured to: generate a control signal based on a configuration parameter that is externally input, and provide the control signal for the first switch unit. The first switch unit is configured to: connect the first port and the first interface based on the control signal, or connect the filter unit and the first interface based on the control signal. For example, if the other end of the first port is suspended, the configuration parameter may be a first parameter or if the other end of the first port is connected to the first antenna of the terminal device, the configuration parameter may be a second parameter. The control unit may generate a first control signal based on the first parameter, or generate a second control signal based on the second parameter. The first switch unit may connect the filter unit and the first interface under control of the first control signal, or connect the first port and the first interface under control of the second control signal.

In a possible implementation, the preprocessing module provided in this embodiment of this application may further include a second switch unit and a third port. One end of the third port is connected to the second switch unit, and the other end of the third port is suspended, or the other end of the third port is configured to connect to a third antenna of the terminal device, and the third antenna is configured to receive a third positioning signal in a third frequency band. The second switch unit is connected to the filter unit, the second switch unit has a connecting end configured to connect to a third interface, where the third interface is an interface corresponding to the third frequency band in the GNSS chip, and the second switch unit is configured to: connect the third port and the third interface when the other end of the third port is connected to the third antenna of the terminal device, or connect the filter unit and the third interface when the other end of the third port is suspended. When the other end of the third port is suspended, the first signal and the second signal further include the third positioning signal in the third frequency band. The filter unit is further configured to: filter the first signal when the other end of the first port and the other end of the third port are suspended, to obtain the third positioning signal, and provide the third positioning signal for the second switch unit; or filter the second signal when the other end of the first port is connected to the first antenna of the terminal device and the other end of the third port is suspended, to obtain the third positioning signal, and provide the third positioning signal for the second switch unit.

The foregoing preprocessing module may be applied to a three-interface GNSS chip, so that the antenna of the terminal device can adapt to the GNSS chip. In addition, the foregoing preprocessing module can meet requirements for different quantities of antennas and a plurality of antenna configuration types, and has relatively high universality.

In a possible implementation, the preprocessing module provided in this embodiment of this application further includes a control unit. The control unit is separately connected to the first switch unit and the second switch unit, and is configured to: generate a control signal based on a configuration parameter that is input and separately provide the control signal for the first switch unit and the second switch unit. The first switch unit is configured to: connect the first port and the first interface based on the control signal, or connect the filter unit and the first interface based on the control signal. The second switch signal is configured to: connect the third port and the third interface based on the control signal, or connect the filter unit and the third interface based on the control signal.

For example, if the other end of the first port and the other end of the third port are suspended, the configuration parameter may be a third parameter; if the other end of the first port is connected to the first antenna of the terminal device, and the other end of the third port is suspended, the configuration parameter may be a fourth parameter; if the other end of the first port is suspended, and the other end of the third port is connected to the third antenna of the terminal device, the configuration parameter may be a fifth parameter; or if the other end of the first port is connected to the first antenna of the terminal device, and the other end of the third port is connected to the third antenna of the terminal device, the configuration parameter may be a sixth parameter. The control unit may generate a first control signal and a third control signal based on the third parameter, provide the first control signal for the first switch unit, and provide the third control signal for the second switch unit; generate a second control signal and the third control signal based on the fourth parameter, provide the second control signal for the first switch unit, and provide the third control signal for the second switch unit; generate the first control signal and a fourth control signal based on the fifth parameter, provide the first control signal for the first switch unit, and provide the fourth control signal for the second switch unit; or generate the second control signal and the fourth control signal based on the sixth parameter, provide the second control signal for the first switch unit, and provide the fourth control signal for the second switch unit. The first switch unit may connect the filter unit and the first interface under control of the first control signal, or connect the first port and the first interface under control of the second control signal. The second switch unit may connect the filter unit and the third interface under control of the third control signal, or connect the third port and the third interface under control of the fourth control signal.

According to a second aspect, an embodiment of this application further provides a terminal device. The terminal device includes a second antenna, a GNSS chip, and the preprocessing module according to any one of the first aspect or the implementations of the first aspect. The second antenna is connected to the second port of the preprocessing module, and the second antenna is configured to receive a hybrid signal including a first positioning signal in a first frequency band and a second positioning signal in a second frequency band. The first port of the preprocessing module is suspended. The first switch unit connects the filter unit and the first interface. The GNSS chip is configured to separately process the first positioning signal and the second positioning signal that are provided by the preprocessing module.

According to a third aspect, an embodiment of this application further provides a terminal device. The terminal device includes a first antenna, a second antenna, a GNSS chip, and the preprocessing module according to any one of the first aspect or the implementations of the first aspect. The first antenna is connected to the first port of the preprocessing module, and is configured to receive a first positioning signal in a first frequency band. The second antenna is connected to the second port of the preprocessing module, and is configured to receive a second positioning signal in a second frequency band. The first switch unit of the preprocessing module connects the first port and the first interface. The GNSS chip is configured to separately process the first positioning signal and the second positioning signal that are provided by the preprocessing module.

According to a fourth aspect, an embodiment of this application further provides a terminal device. The terminal device includes a first antenna, a second antenna, a third antenna, a GNSS chip, and the preprocessing module in the first aspect. The first antenna is connected to the first port of the preprocessing module, and is configured to receive a first positioning signal in a first frequency band. The second antenna is connected to the second port of the preprocessing module, and is configured to receive a second positioning signal in a second frequency band. The third antenna is connected to the third port of the preprocessing module, and is configured to receive a third positioning signal in a third frequency band. The first switch unit of the preprocessing module connects the first port and the first interface. The second switch unit connects the third port and the third interface. The GNSS chip is configured to separately process the first positioning signal, the second positioning signal, and the third positioning signal that are provided by the preprocessing module.

These aspects or other aspects of this application are clearer and easier to understand in descriptions of the following embodiments.

BRIEF DESCRIPTION OF DRAWINGS

The following briefly describes the accompanying drawings used in embodiments of the present invention.

DESCRIPTION OF EMBODIMENTS

To make the objectives, technical solutions, and advantages of this application clearer, the following further describes this application in detail with reference to the accompanying drawings. A specific operation method in a method embodiment may also be used in an apparatus embodiment or a system embodiment. It should be noted that, in the descriptions of this application, "at least one" means one or more, and "a plurality of" means two or more. In view of this, "a plurality of" may also be understood as "at least two" in the embodiments of the present invention. The term "and/or" describes an association relationship for describing associated objects and represents that three relationships may exist. For example A and/or B may represent the following three cases: Only A exists, both A and B exist, and only B exists. In addition, the character "/" generally indicates an "or" relationship between the associated objects. In addition, it should be understood that, in the descriptions of this application, terms such as "first" and "second" are merely used for distinguishing between descriptions, but should not be understood as indicating or implying relative importance, or should not be understood as indicating or implying a sequence.

The following clearly and completely describes the technical solutions in the embodiments of this application with reference to the accompanying drawings in the embodiments of this application.

Figure 1:
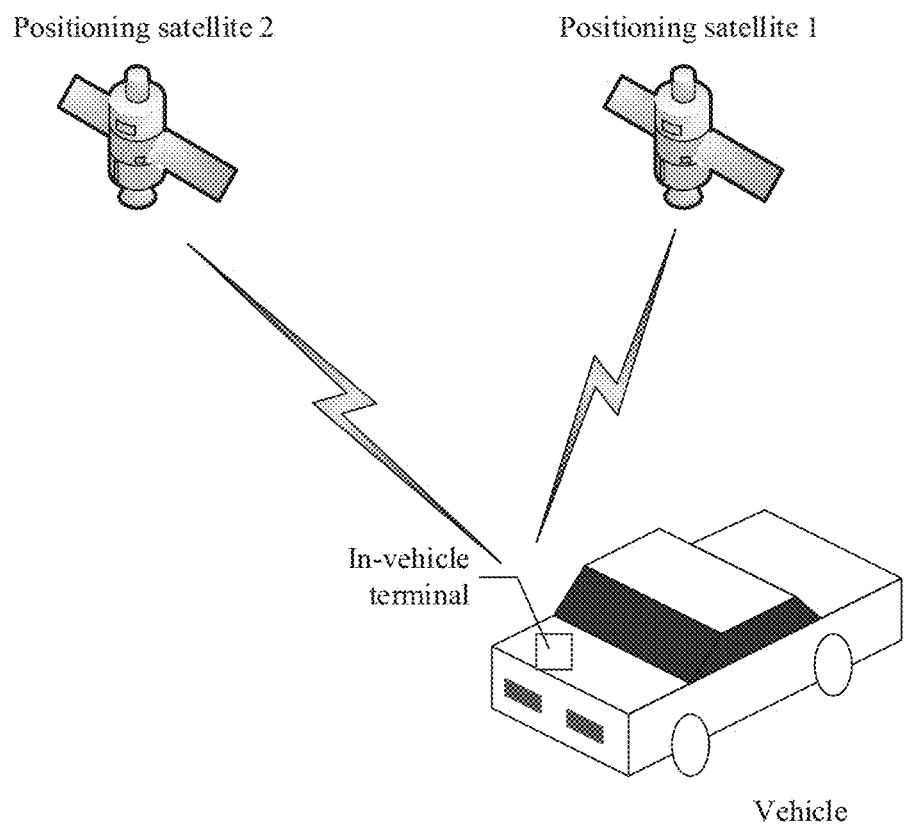
FIG. 1 is a schematic diagram of an architecture of a mobile positioning system.

As a mobile positioning technology develops, the mobile positioning technology gradually becomes one of basic technologies in fields such as automobile navigation, intelligent robots, and autonomous driving. Therefore, a global navigation satellite system (global navigation satellite system, GNSS) chip is increasingly widely applied. An embodiment of this application provides a preprocessing module. The preprocessing module is applicable to a terminal device such as a smartphone or an in-vehicle terminal on which a GNSS chip is mounted. For example, in FIG. 1, an in-vehicle terminal is mounted in a vehicle. The in-vehicle terminal may receive positioning signals sent by a plurality of positioning satellites (a positioning satellite 1 and a positioning satellite 2). A GNSS chip inside the in-vehicle terminal may obtain information about a current geographical location of the vehicle through calculation and analysis based on the received positioning signals.

However, currently, terminal devices have various requirements for configuration quantities and configuration types of antennas. For example, some terminal devices have only one antenna, some terminal devices need to have two antennas, and some terminal devices need to have three or more antennas. In addition, when a terminal device needs to have a plurality of antennas, types of different antennas also need to be different, and the like. When developing a terminal device, a terminal device manufacturer needs to specially design a preprocessing module located between an antenna and a GNSS chip based on an antenna quantity configuration requirement and an antenna type configuration requirement of the terminal device, so that a quantity of antennas and types of the antennas of the terminal device can adapt to the GNSS chip in the terminal device. Consequently, difficulty, design costs, and the like are increased during designing the preprocessing module by the device manufacturer, and development costs of the terminal device are also increased.

For the foregoing problem, an embodiment of this application provides a relatively universal preprocessing module. The preprocessing module may be applied to any terminal device having a requirement for one or more antennas and a requirement for different types of antennas, to avoid a problem of relatively high design costs and relatively high development costs because a terminal device manufacturer needs to specially design different preprocessing modules for terminal devices with requirements for different quantities of antennas or requirements for different types of antennas is avoided.

Figure 2:
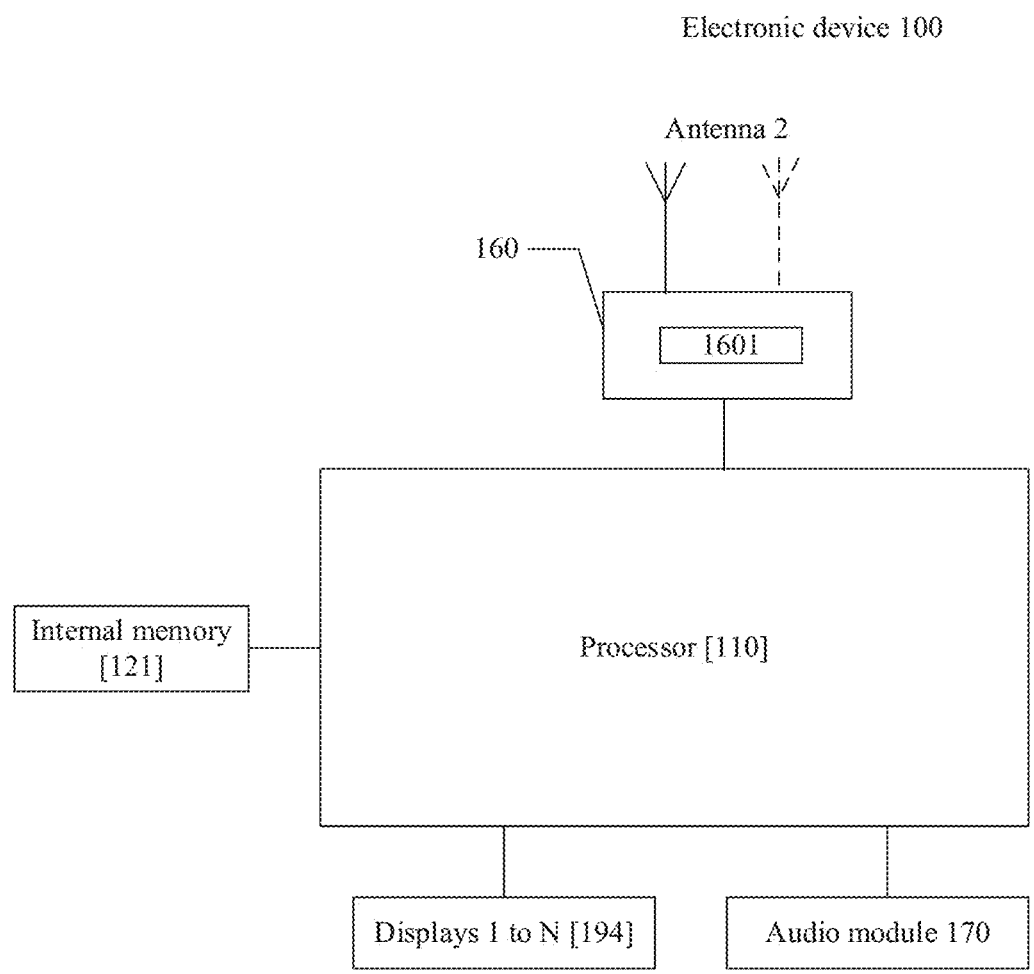
FIG. 2 is a schematic diagram of a structure of a mobile phone according to an embodiment of this application.

The preprocessing module provided in this embodiment of this application may be applied to development and configuration processing of a plurality of types of terminal devices. The terminal device includes a mobile device such as a smartphone or an in-vehicle terminal that has a positioning function. For example, as shown in FIG. 2, the following specifically describes, by using an electronic device 100 as an example, a structure of a terminal device applicable to an embodiment of this application.

The electronic device 100 may include a processor 110, an internal memory 121, an antenna 2, a wireless communication module 160, an audio module 170, a display 194, and the like.

It may be understood that the structure shown in this embodiment of this application does not constitute a specific limitation on the electronic device 100. In some other embodiments of this application, the electronic device 100 may include more or fewer components than those shown in the figure, or combine some components, or split some components, or have different component arrangements. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (Neural-network Processing Unit, NPU), and the like. Different processing units may be independent devices, or may be integrated into one or more processors.

In some embodiments, the processor 110 may include one or more interfaces. The interfaces may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The antenna 2 is configured to transmit and receive electromagnetic wave signals. Each antenna in the electronic device 100 may be configured to cover one or more communication bands. Different antennas may also be multiplexed to improve antenna utilization. For example, a cellular network antenna may be multiplexed as a diversity antenna of a wireless local area network. In some other embodiments, the antenna may be used in combination with a tuning switch.

The wireless communication module 160 may provide a solution applied to the electronic device 100 for wireless communication including wireless local area network (wireless local area network, WLAN), Bluetooth (Bluetooth, BT), a GNSS, frequency modulation (frequency modulation, FM), near field communication (near field communication, NFC), and infrared (infrared, IR) technologies. The wireless communication module 160 may be one or more devices integrating at least one communication processing module. The wireless communication module 160 receives an electromagnetic wave by using the antenna 2, performs frequency modulation and filtering on the electromagnetic wave signal, and sends a processed signal to the processor 110. The wireless communication module 160 may further receive a to-be-sent signal from the processor 110, perform frequency modulation and amplification on the to-be-sent signal, and convert the signal into an electromagnetic wave by using the antenna 2 for radiation. In this embodiment of this application, the wireless communication module 160 is configured to send speech of a first user and machine speech in a target language after translation, or speech that is in a target language and that is sent by a peer user, and machine speech in a first language after translation.

In some embodiments, the antenna 2 is coupled to the wireless communication module 160, so that the electronic device 100 can communicate with a network and another device by using a wireless communication technology. The wireless communication technology may include a GNSS, and the GNSS may include a global positioning system (global positioning system, GPS), a global navigation satellite system (global navigation satellite system, GLONASS), a BeiDou navigation satellite system (BeiDou navigation satellite system BDS), a quasi-zenith satellite system (quasi-zenith satellite system, QZSS) and/or a satellite based augmentation system (satellite based augmentation system, SBAS).

In this embodiment of this application, the wireless communication module 160 includes a GNSS chip 1601, and the GNSS technology may be implemented by using the GNSS chip 1601. Specifically, the GNSS chip 1601 may process a positioning signal received by the antenna 2, to obtain location information of the terminal device.

Currently, in the GNSS technology, a positioning signal may be transmitted by using a plurality of frequency bands. Using the GPS technology as an example, the GPS technology mainly has three available frequency bands: a frequency band L1 (1.6 G), a frequency band L2 (1.22 G), and a frequency band L5 (1.17 G). The GNSS chip 1601 using the GPS technology includes at least one interface, where any interface corresponds to an available frequency band, and may receive a positioning signal in the corresponding available frequency band. For example, if an interface A in the GNSS chip 1601 corresponds to the frequency band L1, the interface A may receive a positioning signal in the frequency band L1.

When the GNSS chip includes a plurality of interfaces, the GNSS chip may receive and process a plurality of positioning signals in different available frequency bands, that is, a multi-frequency processing technology. For the GNSS chip that supports the multi-frequency processing technology, there are a plurality of possible types of positioning signals that can be processed by the GNSS chip. For example, the GNSS chip may process a positioning signal in the frequency band L1 and a positioning signal in the frequency band L2. In another example, the GNSS chip may process the positioning signal in the frequency band L1 and a positioning signal in the frequency band L5. In another example, the GNSS chip may alternatively process the positioning signal in the frequency band L1, the positioning signal in the frequency band L2, and the positioning signal in the frequency band L5.

The electronic device 100 implements a display function by using the GPU, the display 194, the application processor, and the like. The GPU is a microprocessor for image processing, and is connected to the display 194 and the application processor. The GPU is configured to perform mathematical and geometric calculation for graphics rendering. The processor 110 may include one or more GPUs that execute program instructions to generate or change display information.

The display 194 is configured to display an image, a video, and the like. The display 194 includes a display panel. The display panel may use an LCD (liquid crystal display, liquid crystal display), an OLED (organic light-emitting diode, organic light-emitting diode), an active-matrix organic light emitting diode or active-matrix organic light emitting diode (active-matrix organic light emitting diode, AMOLED), a flex light-emitting diode (flex light-emitting diode, FLED), a mini-LED, a micro-LED, a micro-OLED, a quantum dot light emitting diode (quantum dot light emitting diode, QLED), or the like. In some embodiments, the electronic device 100 may include one or N displays, where N is a positive integer greater than 1. In this embodiment of this application, the display 194 may be configured to display a call interface, a translation interface, a language setting interface, and the like.

The internal memory 121 may be configured to store computer-executable program code, where the executable program code includes instructions. The processor 110 executes various function applications and data processing of the electronic device 100 by running the instructions stored in the internal memory 121. The internal memory 121 may include a program storage area and a data storage area. The program storage area may store an operating system, an application required by at least one function (for example, a sound playing function or an image playing function), and the like. The data storage area may store data (for example, audio data and an address book) and the like created in a process of using the electronic device 100. In addition, the internal memory 121 may include a high-speed random access memory, and may further include a non-volatile memory, for example, at least one disk storage device, a flash memory, or a universal flash storage (universal flash storage, UFS).

The audio module 170 is configured to convert digital audio information into an analog audio signal output, and is also configured to convert an analog audio input into a digital audio signal. The audio module 170 may also be configured to encode and decode an audio signal. In some embodiments, the audio module 170 may be disposed in the processor 110, or some function modules of the audio module 170 may be disposed in the processor 110.

It should be understood that, in actual application, the terminal device may have more or fewer components than the electronic device 100 in FIG. 2. This is not limited in this embodiment of this application.

However, in the terminal device, an antenna (for example, the antenna 2 in FIG. 2) configured to receive positioning signals has a plurality of possible configurations, resulting in various types of received signals. For example, one antenna is mounted in the terminal device, and the antenna may be configured to receive the positioning signal in the frequency band L1 and the positioning signal in the frequency band L2 (and the positioning signal in the frequency hand L5). In another example, two antennas are mounted in the terminal device. One antenna may be configured to receive the positioning signal in the frequency band L1, the other antenna is configured to receive the positioning signal in the frequency band L2, and the like.

If configuration manners of the quantity and types of antennas in the terminal device do not adapt to configurations of interfaces in the GNSS chip, the GNSS chip cannot operate normally. For example, if one antenna is mounted in the terminal device, the antenna is configured to receive the positioning signal in the frequency band L1 and the positioning signal in the frequency band L2. That is, the antenna may receive a hybrid signal including the positioning signal in the frequency band L1 and the positioning signal in the frequency band L2. The GNSS chip includes an interface A corresponding to the frequency band L1 and an interface B corresponding to the frequency band L2. Because the antenna receives the hybrid signal, neither the interface A nor the interface B can identify the hybrid signal, and the GNSS chip cannot process the positioning signals received by the antenna.

In view of this, an embodiment of this application provides a preprocessing module of a GNSS chip. The preprocessing module is disposed between the GNSS chip and an antenna in a terminal device, and can process positioning signals received by a plurality of quantities and types of antennas, to obtain a plurality of positioning signals in different frequency bands, and respectively provide the obtained positioning signals in the different frequency bands for a plurality of interfaces in the GNSS chip, so that when different quantities and types of antennas are configured in the terminal device, adaptability between the antennas and the GNSS chip can be ensured.

The following further describes, by using the following specific embodiments, the technical solutions provided in the embodiments of this application.

Embodiment 1

An embodiment of this application provides a preprocessing module of a GNSS chip. The preprocessing module is applicable to the GNSS chip that includes two interfaces. The two interfaces of the GNSS chip respectively correspond to different frequency bands. A first interface corresponds to a first frequency band, and a second interface corresponds to a second frequency band. It may be understood that, in addition to interfaces configured to receive positioning signals, the GNSS chip further includes another interface. Unless otherwise specified, the following interfaces of the GNSS chip in this embodiment of this application specifically mean interfaces configured to receive positioning signals.

Figure 3:
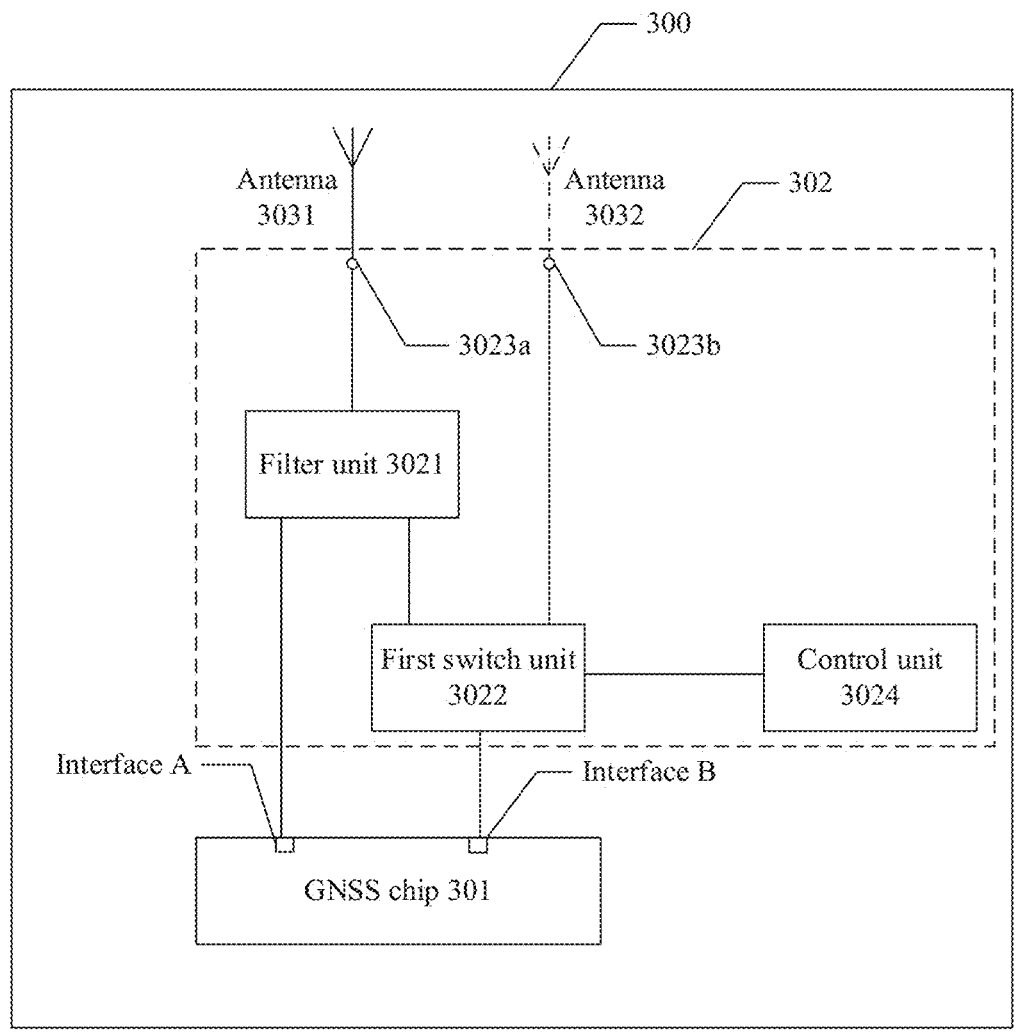
FIG. 3 is a first schematic diagram of a structure of a terminal device according to an embodiment of this application.

As shown in FIG. 3, a preprocessing module 302 of a GNSS chip provided in this embodiment of this application mainly includes a first port (for example, a port 3023b), a second port (for example, a port 3023a), a filter unit 3021, and a first switch unit 3022. The preprocessing module 302 is applicable to the GNSS chip 301 including an interface A and an interface B. A correspondence between the interfaces of the GNSS chip 301, the frequency bands, and the positioning signals may be shown in Table 1.

TABLE 1

| Interface | Frequency band | Positioning signal |
| --- | --- | --- |
| Interface A | Frequency band 2 | Positioning signal a |
| Interface B | Frequency band 1 | Positioning signal b |

The interface A corresponds to the frequency band 1, and may receive the positioning signal a in the frequency band 1. The interface B is similar to the interface A. Details are not described again.

Based on the correspondence shown in Table 1, as shown in FIG. 3, one end of the port 3023b of the preprocessing module 302 is connected to the first switch unit 3022, and the other end of the port 3023b of the preprocessing module 302 is suspended, or the other end of the port 3023b of the preprocessing module 302 is configured to connect to a first antenna (an antenna 3032) of a terminal device. The first switch unit 3022 is connected to the filter unit 3021. The first switch unit 3022 has a connecting end configured to connect to a first interface (the interface B) of the GNSS chip. The first switch unit 3022 is configured to connect the port 3023b and the interface B, or connect the filter unit 3021 and the interface B. One end of the second port 3023a is connected to the filter unit 3021, and the other end of the second port 3023a is configured to connect to a second antenna (an antenna 3031) of the terminal device 300. The filter unit 3021 has a connecting end configured to connect to the second interface (the interface A) of the GNSS chip 301. The filter unit 3021 is configured to: provide the positioning signal a for the interface A, or provide the positioning signal a for the interface A, and provide the positioning signal h for the first switch unit 3022.

The preprocessing module 302 provided in this embodiment of this application can enable the antennas of the terminal device to adapt to the GNSS chip. In addition, the preprocessing module 302 has a simple structure, and may be applied to terminal devices with configurations of a plurality of quantities and types of antennas, and has relatively high universality. This helps reduce development costs of the terminal device.

Specifically, a specific connection manner of the other end of the port 3023b and a connection state of the first switch unit 3022 may be changed, so that antennas of a plurality of different configuration types can adapt to the GNSS chip

301. Next, at least two possible cases are further described by using the terminal device 300 shown in FIG. 3 as an example.

1.1 One Antenna is Configured in the Terminal Device

For example, only the antenna 3031 is configured in the terminal device 300, and the antenna 3031 may be configured to receive both the positioning signal a and the positioning signal b. In other words, a signal received by the antenna 3031 is a hybrid signal including the positioning signal a and the positioning signal b.

For the terminal device 300 of the foregoing antenna configuration type, the other end of the port 3023*b* in the preprocessing module 302 is suspended, and the first switch unit 3022 connects the filter unit 3021 and the interface B.

In this case, the filter unit 3021 may filter the hybrid signal received by the antenna 3031 to obtain the positioning signal a and the positioning signal b in the hybrid signal, provide the positioning signal b for the first switch unit 3022, and provide the positioning signal a for the interface A. Because the first switch unit 3022 connects the filter unit 3021 and the interface B, the positioning signal h provided by the filter unit 3021 for the first switch unit 3022 is to be transmitted to the interface B. In this case, the GNSS chip 301 can separately receive the positioning signal a and the positioning signal b, and process the two positioning signals.

1.2 Two Antennas are Configured in the Terminal Device

For example, the antenna 3031 and the antenna 3032 are configured in the terminal device 300. The antenna 3031 is configured to receive the positioning signal a, and the antenna 3032 is configured to receive the positioning signal b.

For the terminal device 300 of the foregoing antenna configuration type, the other end of the port 3023*b* in the preprocessing module 302 is connected to the antenna 3032, and the first switch unit 3022 connects the filter unit 3021 and the interface B.

In this case, the first switch unit 3022 may transmit the positioning signal b received by the antenna 3032 to the interface B. The filter unit 3021 may transmit the positioning signal a received by the antenna 3031 to the interface A.

Specifically, in the foregoing two cases, the filter unit 3021 mainly has the following several possible implementations:

In a possible implementation 1, the filter unit 3021 may monitor a conducting status of the first switch unit 3022. If the first switch unit 3022 connects the filter unit 3021 and the interface B, the filter unit 3021 filters the signal (in this case, the signal is the hybrid signal) received by the antenna 3031, to obtain the positioning signal a and the positioning signal b, provides the positioning signal a for the interface A, and provides the positioning signal b for the interface B. If the first switch unit 3022 disconnects the filter unit 3021 from the interface B, that is, the first switch unit 3022 connects the port 3023*b* and the interface B, the filter unit 3021 provides the signal (in this case, the positioning signal a) received by the antenna 3031 for the interface A.

In a possible implementation 2, the preprocessing module 302 further includes a control unit 3024. The control unit 3024 may send an indication signal to the filter unit 3021, to indicate whether the filter unit 3021 filters the signal received by the antenna 3031. For example, in case 1.1, the control unit 3024 sends a control signal 1 to the filter unit 3021, to indicate the filter unit 3021 to filter the signal received by the antenna 3031. In case 1.2, the control unit 3024 sends a control signal 2 to the filter unit 3021, to indicate the filter unit 3021 to provide the signal received by the antenna 3031 for the interface A.

In a possible implementation 3, the filter unit 3021 keeps filtering the signal received by the antenna 3031. In case 1.2, the filter unit 3021 still filters the signal received by the antenna 3031. Because the signal received by the antenna 3031 does not include the positioning signal b, the filter unit 3021 can obtain only the positioning signal a after filtering, and does not obtain the positioning signal b. In addition, in this case, the first switch unit 3022 disconnects the filter unit 3021 from the interface B. Therefore, even if the filter unit 3021 still filters the signal received by the antenna 3031, reception of the positioning signal by the GNSS chip 301 is not affected.

For the first switch unit 3022, in a possible implementation, in a process of manufacturing the terminal device 300, a connection state of the first switch unit 3022 may be configured by using a circuit. For example, when the preprocessing module 302 is sold, there are two electrical connection paths. An electrical connection path A may connect the filter unit 3021 and the interface B, and an electrical connection path B may connect the interface 3023*b* and the interface B. Research and development personnel of the terminal device may keep one electrical connection path and disconnect the other electrical connection path based on an antenna configuration of the terminal device 300. Specifically, if only the antenna 3031 is configured in the terminal device 300, the research and development personnel may keep the electrical connection path A and disconnect the electrical connection path B; or if the antenna 3031 and the antenna 3032 are configured in the terminal device 300, the research and development personnel may keep the electrical connection path B, and disconnect the electrical connection path A.

In another possible implementation, as shown in FIG. 3, a connection between the control unit 3024 and the first switch unit 3022 may also be implemented by using a configuration parameter that is input into the control unit 3024. For example, research and development personnel of a terminal device manufacturer may input a configuration parameter into an operating system of the control unit 3024 based on the antenna configuration of the terminal device 300. The configuration parameter may be a parameter specified in a user manual when the preprocessing module is sold. After the configuration parameter is input, the control unit 3024 may perform signal generation processing based on the configuration parameter to obtain a control signal, where the control signal has an effect of enabling the first switch unit 3022 to connect the port 3023*b* and the interface B, or connect the filter unit 3021 and the interface B.

For example, when the preprocessing module is sold, the user manual specifies a parameter 1 and a parameter 2. The parameter 1 is applicable to a terminal device that includes only one antenna, and the parameter 2 is applicable to a terminal device that includes two antennas. The research and development personnel may perform selection based on an antenna configuration of the researched and developed terminal device. Specifically, if only the antenna 3031 is configured in the terminal device 300, the research and development personnel may input the parameter 1 into the operating system of the control unit 3024. A first control signal generated by the control unit 3024 based on the parameter 1 may enable the first switch unit 3022 to connect the filter unit 3021 and the interface B. If the antenna 3031 and the antenna 3032 are configured in the terminal device 300, the research and development personnel may input the parameter 2 into the operating system of the control unit 3024. A second control signal generated by the control unit 3024 based on the parameter 2 may enable the first switch unit 3022 to connect the port 3023b and the interface B.

Embodiment 2

Figure 4:
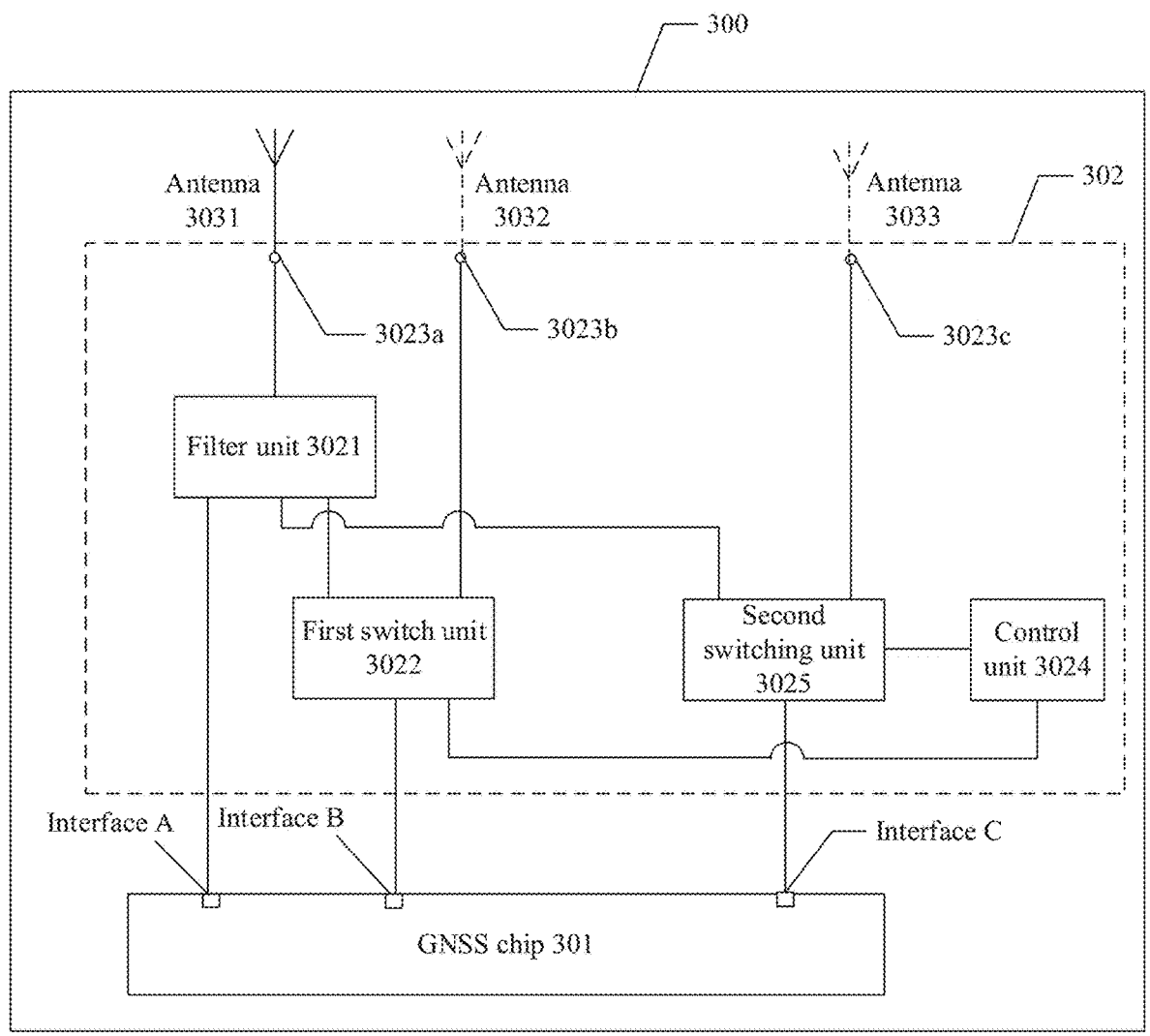
FIG. 4 is a second schematic diagram of a structure of a terminal device according to an embodiment of this application.

An embodiment of this application further provides a preprocessing module of a GNSS chip. The preprocessing module is applicable to the GNSS chip including three interfaces. Compared with the GNSS chip in Embodiment 1, the GNSS chip further includes a third interface corresponding to a third frequency band. As shown in FIG. 4, the preprocessing module 302 is applicable to a GNSS chip 301 including an interface A, an interface B, and an interface C. A correspondence between the interfaces of the GNSS chip, frequency bands, and positioning signals may be shown in Table 2.

TABLE 2

| Interface | Frequency band | Positioning signal |
| --- | --- | --- |
| Interface A | Frequency band 2 | Positioning signal a |
| Interface B | Frequency band 1 | Positioning signal b |
| Interface C | Frequency band 3 | Positioning signal c |

For a specific description of the correspondence, refer to Table 1. Details are not described again. Based on the correspondence shown in Table 2, after FIG. 4 is compared with FIG. 3, it can be learned that the preprocessing module 302 in FIG. 4 further includes a port 3023c and a second switch unit 3025.

One end of the port 3023c is connected to the second switch unit 3025, and the other end of the port 3023c is suspended, or the other end of the port 3023c is configured to connect to an antenna 3033 of a terminal device.

The second switch unit 3025 is connected to a filter unit 3021. The second switch unit 3025 has a connecting end configured to connect to the interface C. The second switch unit 3025 is configured to connect the third port 3023c and the interface C, or connect the filter unit 3021 and the interface C.

The filter unit 3021 is further configured to provide a third positioning signal for the second switch unit 3025 when the other end of the port 3023c is suspended.

The preprocessing module shown in FIG. 4 helps enable antennas of a plurality of different configuration types to adapt to the three-interface GNSS chip. Next, three possible cases are further described by using the terminal device 300 shown in FIG. 4 as an example.

2.1 One Antenna is Configured in the Terminal Device

For example, only the antenna 3031 is configured in the terminal device 300, and a signal received by the antenna 3031 is a hybrid signal including the positioning signal a, the positioning signal b, and the positioning signal c.

For the terminal device 300 having the foregoing antenna configuration type, the other end of the port 3023b in the preprocessing module 302 is suspended, the other end of the port 3023c is suspended, the first switch unit 3022 connects the filter unit 3021 and the interface B, and the second switch unit 3025 connects the filter unit 3021 and the interface C.

In this case, the filter unit 3021 may filter the hybrid signal received by the antenna 3031, to obtain the positioning signal a, the positioning signal b, and the positioning signal c in the hybrid signal, provide the positioning signal b for the first switch unit 3022, provide the positioning signal a for the interface A, and provide the positioning signal c for the second switch unit 3025.

Because the first switch unit 3022 connects the filter unit 3021 and the interface B, the positioning signal b provided by the filter unit 3021 for the first switch unit 3022 is to be transmitted to the interface B. Similarly, the positioning signal c provided by the filter unit 3021 for the second switch unit 3025 is to be transmitted to the interface C. In this case, the GNSS chip 301 can separately receive the positioning signal a, the positioning signal b, and the positioning signal c, and process the three positioning signals.

2.2 Two Antennas are Configured in the Terminal Device

For example, the antenna 3031 and the antenna 3032 are configured in the terminal device 300. The antenna 3031 is configured to receive a hybrid signal including the positioning signal a and the positioning signal c, and the antenna 3032 is configured to receive the positioning signal b.

For the terminal device 300 having the foregoing antenna configuration type, the other end of the port 3023b in the preprocessing module 302 is connected to the antenna 3032, the other end of the antenna 3023c is suspended, the first switch unit 3022 connects the port 3023b and the interface B, and the second switch unit 3025 connects the filter unit 3021 and the interface C.

In this case, the first switch unit 3022 may transmit the positioning signal b received by the antenna 3032 to the interface B. The filter unit 3021 may filter the hybrid signal received by the antenna 3031 to obtain the positioning signal a and the positioning signal c, provide the positioning signal a for the interface A, and provide the positioning signal c for the second switch unit 3025. Because the second switch unit 3025 connects the filter unit 3021 and the interface C, the positioning signal c provided by the filter unit 3021 for the second switch unit 3025 is to be transmitted to the interface C.

In this case, the GNSS chip 301 can separately receive the positioning signal a, the positioning signal b, and the positioning signal c, and process the three positioning signals.

2.3 Three Antennas are Configured in the Terminal Device

For example, the antenna 3031, the antenna 3032, and the antenna 3033 are configured in the terminal device 300. The antenna 3031 is configured to receive the positioning signal a, the antenna 3032 is configured to receive the positioning signal b, and the antenna 3033 is configured to receive the positioning signal c.

For the terminal device 300 having the foregoing antenna configuration type, the other end of the port 3023b in the preprocessing module 302 is connected to the antenna 3032, the other end of the port 3023c is connected to the antenna 3033, the first switch unit 3022 connects the port 3023b and the interface B, and the second switch unit 3025 connects the port 3023c and the interface C.

In this case, the first switch unit 3022 may transmit the positioning signal b received by the antenna 3032 to the interface B. The second switch unit 3025 may transmit the positioning signal c received by the antenna 3033 to the interface C. The filter unit 3021 may transmit the positioning signal a received by the antenna 3031 to the interface A.

In the foregoing three cases, for a specific implementation of the filter unit 3021, refer to Embodiment 1. Details are not described again.

It may be understood that, for the preprocessing module 300 applicable to the three-interface GNSS chip, a configuration parameter may alternatively be set in a control unit 3024, and the control unit 3024 generates a control signal based on the configuration parameter and provides the control signal for the first switch unit 3022 and the second switch unit 3025, to control connection states of the two switch units respectively.

For example, the configuration parameter may be set for the terminal device 300 based on a correspondence shown in Table 3.

TABLE 3

| Configuration parameter | Port 3023b | Port 3023c |
| --- | --- | --- |
| Parameter 3 | Suspended | Suspended |
| Parameter 4 | Connected to 3022 | Suspended |
| Parameter 5 | Suspended | Connected to 3023 |
| Parameter 6 | Connected to 3022 | Connected to 3023 |

As shown in Table 3, if the other end of the port 3023b is suspended, and the other end of the port 3023c is suspended, the configuration parameter set for the control unit 3024 is the parameter 3. Other parameters are similar to the parameter 3. Details are not described again.

Based on the configuration parameters shown in Table 3, the control unit 3024 may separately generate control signals shown in Table 4:

TABLE 4

| Configuration parameter | Control signal B | Control signal C |
| --- | --- | --- |
| Parameter 3 | First control signal | Third control signal |
| Parameter 4 | Second control signal | Third control signal |
| Parameter 5 | First control signal | Fourth control signal |
| Parameter 6 | Second control signal | Fourth control signal |

As shown in Table 4, the control unit 3024 may generate two control signals based on the configuration parameter, where the control signal B is a control signal provided for the first switch unit 3022, and the control signal C is a control signal provided for the second switch unit 3025. For example, the configuration parameter is the parameter 3. The control unit 3024 may generate the first control signal and the third control signal based on the parameter 3, provide the first control signal for the first switch unit 3022, and provide the third control signal for the second switch unit 3025. Other parameters are similar to the parameter 3. Details are not described again.

If receiving the first control signal, the first switch unit 3022 connects the filter unit 3021 and the interface B, and if receiving the second control signal, the first switch unit 3022 connects the port 3023b and the interface B. If receiving the third control signal, the second switch unit 3025 connects the filter unit 3021 and the interface C, and if receiving the fourth control signal, the second switch unit 3025 connects the port 3023c and the interface B.

Based on a same technical concept, an embodiment of this application further provides a terminal device. The terminal device includes a second antenna (an antenna 3031), a GNSS chip, and the preprocessing module provided in any one of the foregoing embodiments.

Figure 5:
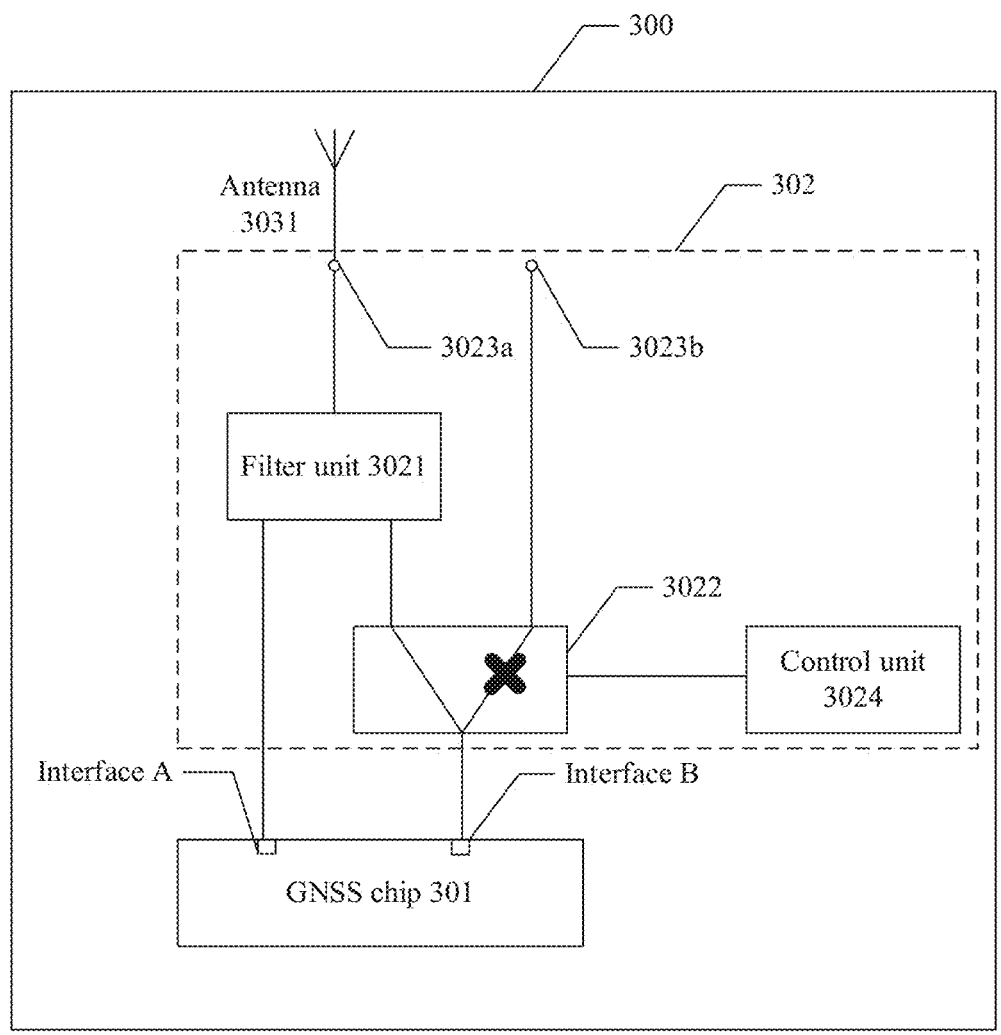
FIG. 5 is a third schematic diagram of a structure of a terminal device according to an embodiment of this application.

For a preprocessing module applicable to a dual-interface GNSS chip, the terminal device mainly falls into the following three cases:

In case 1, only the second antenna is configured in the terminal device. As shown in FIG. 5, a terminal device 300 includes the antenna 3031, a preprocessing module 302, and a GNSS chip 301. A port 3023a of the preprocessing module 302 is connected to the antenna 3031, a port 3023b of the preprocessing module 302 is suspended, a first switch unit 3022 connects a filter unit 3021 and an interface B, and disconnects the port 3023b from the interface B, so that the antenna 3031 adapts to the GNSS chip 301.

Figure 6:
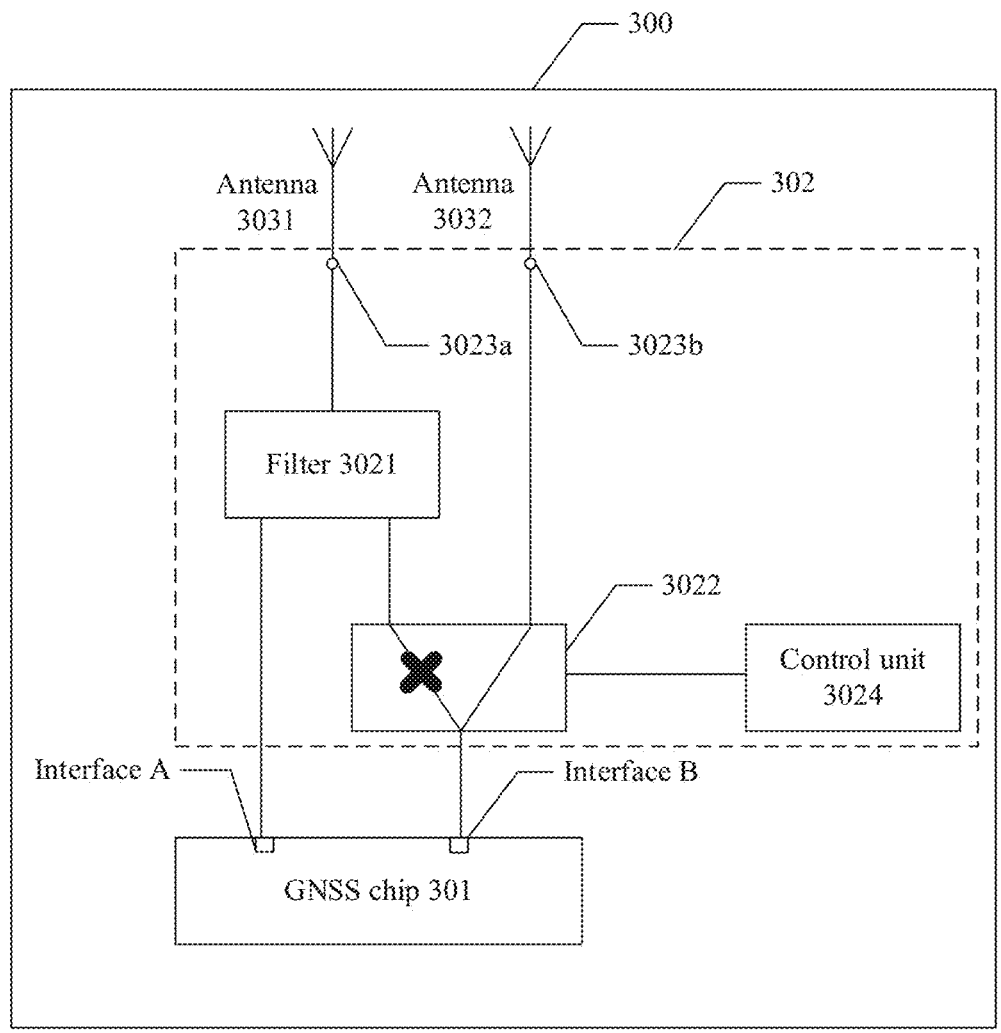
FIG. 6 is a fourth schematic diagram of a structure of a terminal device according to an embodiment of this application.

In case 2, a first antenna and the second antenna are configured in the terminal device. As shown in FIG. 6, a terminal device 300 includes an antenna 3031, an antenna 3032, a preprocessing module 302, and a GNSS chip 301. A port 3023a of the preprocessing module 302 is connected to the antenna 3031, a port 3023b of the preprocessing module 302 is connected to the antenna 3032, a first switch unit 3022 connects the port 3023b and an interface B, and disconnects the port 3023b from a filter unit 3021, so that the antenna 3031 adapts to the GNSS chip 301.

Figure 7:
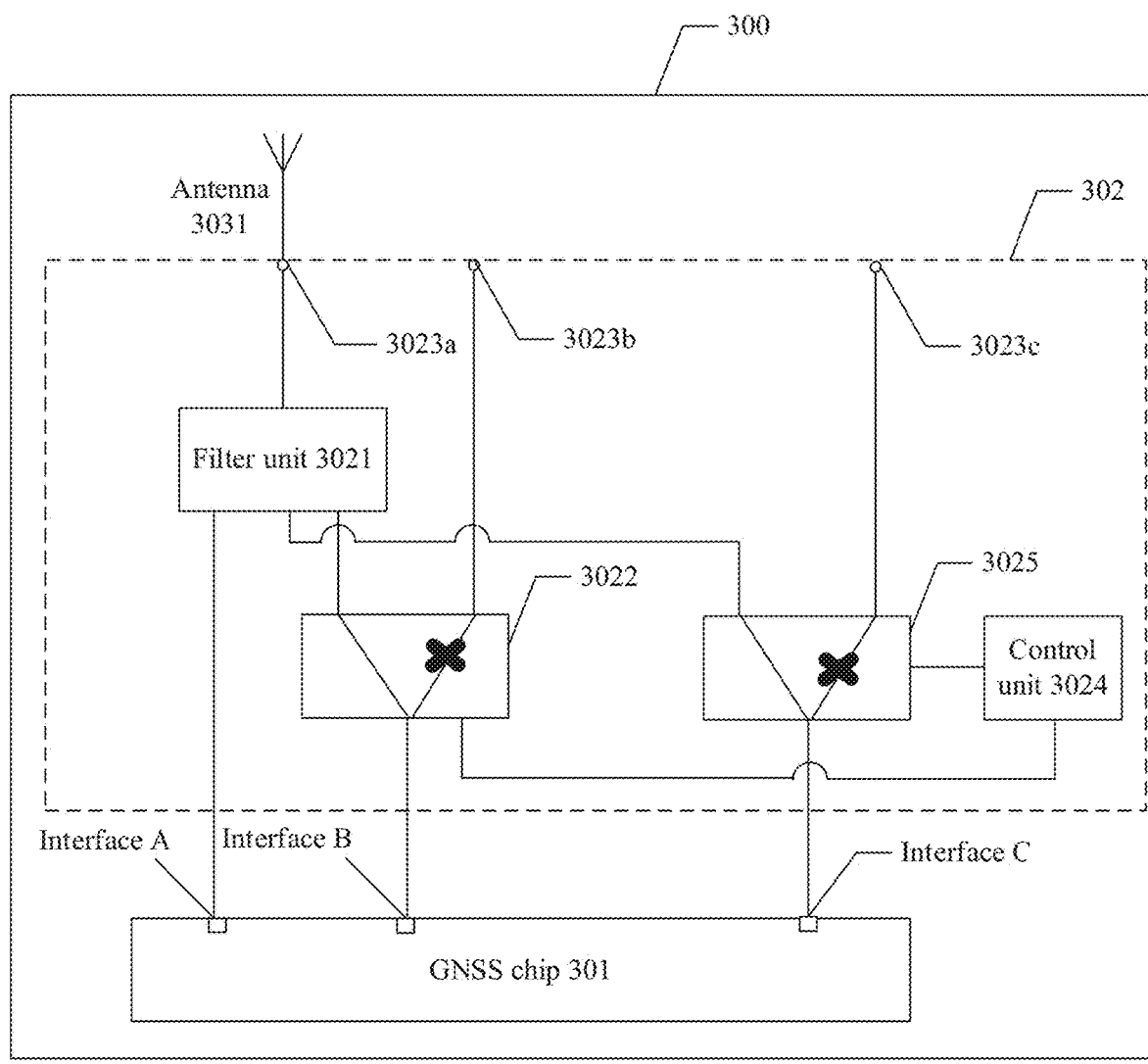
FIG. 7 is a fifth schematic diagram of a structure of a terminal device according to an embodiment of this application.

For a preprocessing module applicable to a three-interface GNSS chip, the terminal device mainly falls into the following three cases:

In case 1, only the second antenna is configured in the terminal device. As shown in FIG. 7, a terminal device 300 includes the antenna 3031, a preprocessing module 302, and a GNSS chip 301. A port 3023a of the preprocessing module 302 is connected to the antenna 3031, a port 3023b and a port 3023c of the preprocessing module 302 are suspended, a first switch unit 3022 connects a filter unit 3021 and an interface B, and disconnects the port 3023b from the interface B, a second switch unit 3025 connects the filter unit 3021 and an interface C, and disconnects the port 3023c from the interface; C, so that the antenna 3031 adapts to the GNSS chip 301.

Figure 8:
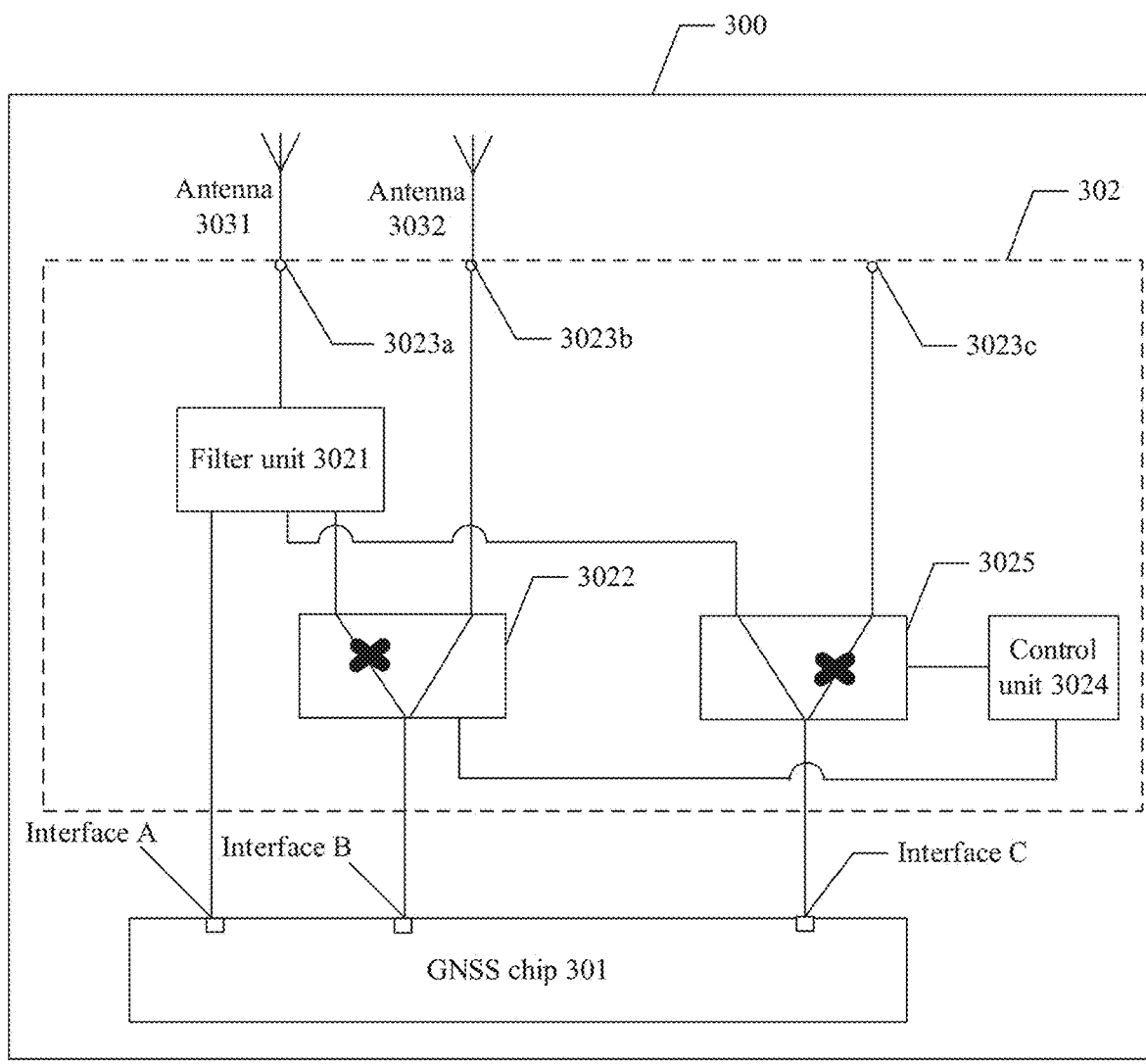
FIG. 8 is a sixth schematic diagram of a structure of a terminal device according to an embodiment of this application.

In case 2, a first antenna and the second antenna are configured in the terminal device. As shown in FIG. 8, a terminal device 300 includes an antenna 3031, an antenna 3032, a preprocessing module 302, and a GNSS chip 301. A port 3023a of the preprocessing module 302 is connected to the antenna 3031, a port 3023b of the preprocessing module 302 is connected to the antenna 3032, a port 3023c of the preprocessing module 302 is suspended, a first switch unit 3022 disconnects a filter unit 3021 from an interface B, and connects the port 3023b and the interface B, and a second switch unit 3025 connects the filter unit 3021 and an interface C, and disconnects the port 3023c from the interface C, so that the antenna 3031 and the antenna 3032 adapt to the GNSS chip 301.

Figure 9:
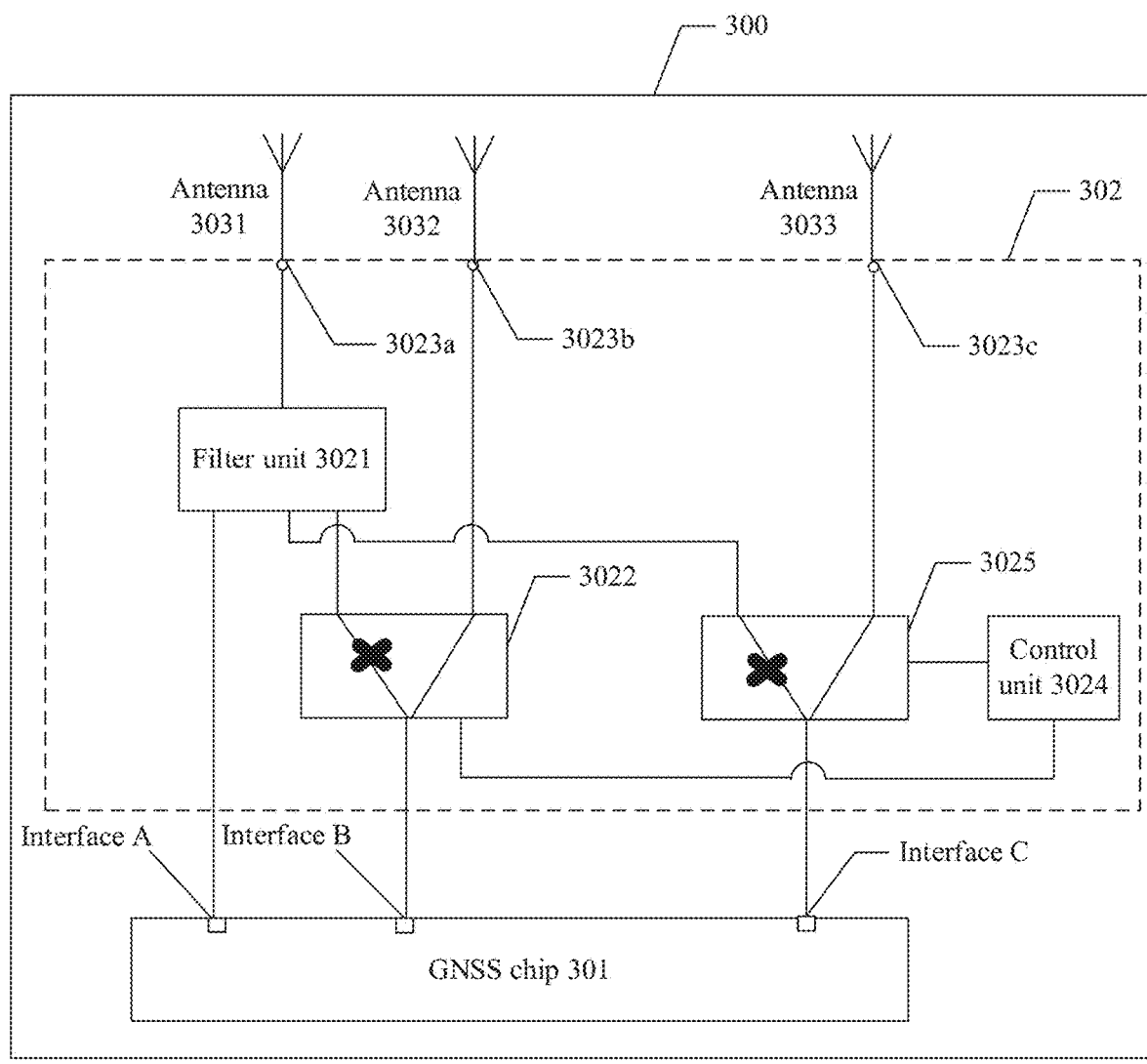
FIG. 9 is a seventh schematic diagram of a structure of a terminal device according to an embodiment of this application.

In case 3, a first antenna, the second antenna, and a third antenna are configured in the terminal device. As shown in FIG. 9, a terminal device 300 includes an antenna 3031, an antenna 3032, an antenna 3033, a preprocessing module 302, and a GNSS chip 301. A port 3023a of the preprocessing module 302 is connected to the antenna 3031, a port 3023b of the preprocessing module 302 is connected to the antenna 3032, a port 3023c of the preprocessing module 302 is connected to the antenna 3033, a first switch unit 3022 disconnects a filter unit 3021 from an interface B, and connects the port 3023b and the interface B, and a second switch unit 3025 disconnects the filter unit 3021 from an interface C, and connects the port 3023c and the interface C, so that the antenna 3031 and the antenna 3032 adapt to the GNSS chip 301.

Although this application is described with reference to specific features and the embodiments thereof, it is clear that various modifications and combinations may be made to them without departing from the spirit and scope of this application. Correspondingly, the specification and accompanying drawings are merely example descriptions of this application defined in the appended claims, and are considered as any of or all modifications, variations, combinations or equivalents that cover the scope of this application. It is clear that a person skilled in the art can make various modifications and variations to this application without departing from the spirit and scope of this application. This application is intended to cover these modifications and variations of this application provided that they fall within the scope of protection defined by the claims and their equivalent technologies.

What is claimed is:

1. A preprocessing system of a global navigation satellite system (GNSS) chip comprising:
   a first interface corresponding to a first frequency band in the GNSS chip;
   a second interface corresponding to a second frequency band in the GNSS chip;
   a filter comprising:
      a first end;
      a second end; and
      a first connecting end coupled to the second interface;
   a first port comprising:
      a third end; and
      a fourth end configured to either suspend or couple to a first antenna of a terminal device,
      wherein the first port is configured to receive, using the first antenna, a first positioning signal in the first frequency band;
   a first switch comprising:
      a fifth end coupled to the third end;
      a sixth end coupled to the second end; and
      a second connecting end coupled to the first interface,
      wherein the first switch is configured to:
         couple the first port and the first interface when the fourth end is coupled to the first antenna; and
         couple the filter and the first interface when the fourth end is suspended; and
   a second port comprising:
      an eighth end coupled to the first end; and
      a ninth end coupled to a second antenna of the terminal device,
      wherein the second port is configured to:
         receive, using the second antenna, a first signal comprising the first positioning signal and a second positioning signal in the second frequency band when the fourth end is suspended; and
         receive, using the second antenna, a second signal comprising the second positioning signal when the fourth end is coupled to the first antenna, and
   wherein the filter is configured to:
      filter the first signal when the fourth end is suspended to obtain the first positioning signal and the second positioning signal, provide the first positioning signal to the first switch, and provide the second positioning signal to the second interface; and
      provide the second positioning signal to the second interface when the fourth end is coupled to the first antenna.

2. The preprocessing system of claim 1, wherein the first switch further comprises a seventh end, wherein the preprocessing system further comprises a control system comprising a tenth end coupled to the seventh end, and wherein the control system is configured to:
   obtain a configuration parameter;
   generate a control signal based on the configuration parameter; and
   provide the control signal to the first switch, and
   wherein the first switch is further configured to couple, based on the control signal, either the first port and the first interface, or the filter and the first interface.

3. The preprocessing system of claim 2, wherein the configuration parameter is a first parameter when the fourth end is suspended, wherein the configuration parameter is a second parameter when the fourth end is coupled to the first antenna, and wherein the control system is further configured to:
   generate a first control signal based on the first parameter; or
   generate a second control signal based on the second parameter, and
   wherein the first switch is further configured to:
      couple the filter and the first interface based on the first control signal; or
      couple the first port and the first interface based on the second control signal.

4. The preprocessing system of claim 2, further comprising:
   a third interface corresponding to a third frequency band in the GNSS chip;
   a third port comprising:
      an eleventh end; and
      a twelfth end configured to either suspend or couple to a third antenna of the terminal device,
      wherein the third port is configured to receive, using the third antenna, a third positioning signal in the third frequency band; and
   a second switch comprising:
      a thirteenth end coupled to the eleventh end;
      a fourteenth end coupled to a fifteenth end of the filter;
      a sixteenth end; and
      a third connecting end coupled to the third interface,
      wherein the second switch is configured to:
         couple the third port and the third interface when the twelfth end is coupled to the third antenna; and
         couple the filter and the third interface when the twelfth end is suspended,
      wherein the first signal and the second signal further comprise the third positioning signal when the twelfth end is suspended, and
      wherein the filter is further configured to:
         filter the first signal when the fourth end and the twelfth end are suspended to obtain the third positioning signal, and provide the third positioning signal to the second switch; and
         filter the second signal when the fourth end is coupled to the first antenna and the twelfth end is suspended to obtain the third positioning signal, and provide the third positioning signal to the second switch.

5. The preprocessing system of claim 4, further comprising a control system comprising:
   a tenth end coupled to the seventh end; and
   a seventeenth end coupled to the sixteenth end,
   wherein the control system is configured to:
      obtain a configuration parameter;
      generate a control signal based on the configuration parameter; and
      provide the control signal to the first switch and the second switch,
   wherein the first switch is further configured to couple, based on the control signal, either the first port and the first interface, or the filter and the first interface, and
   wherein the second switch is further configured to couple, based on the control signal, either the third port and the third interface, or the filter and the third interface.

6. The preprocessing system of claim 5, wherein the configuration parameter is a third parameter when the fourth end and the twelfth end are suspended, wherein the configuration parameter is a fourth parameter when the fourth end is coupled to the first antenna and the twelfth end is suspended, wherein the configuration parameter is a fifth parameter when the fourth end is suspended and the twelfth end is coupled to the third antenna, wherein the configuration parameter is a sixth parameter when the fourth end is coupled to the first antenna and the twelfth end is coupled to the third antenna, and wherein the control system is further configured to:
  generate a first control signal and a third control signal based on the third parameter, provide the first control signal to the first switch, and provide the third control signal to the second switch;
  generate a second control signal and the third control signal based on the fourth parameter, provide the second control signal to the first switch, and provide the third control signal to the second switch;
  generate the first control signal and a fourth control signal based on the fifth parameter, provide the first control signal to the first switch, and provide the fourth control signal to the second switch; or
  generate the second control signal and the fourth control signal based on the sixth parameter, provide the second control signal to the first switch, and provide the fourth control signal to the second switch.

7. The preprocessing system of claim 6, wherein the first switch is further configured to couple the filter and the first interface based on the first control signal.

8. The preprocessing system of claim 6, wherein the first switch is further configured to couple the first port and the first interface based on the second control signal.

9. The preprocessing system of claim 6, wherein the second switch is further configured to couple the filter and the third interface based on the third control signal.

10. The preprocessing system of claim 6, wherein the second switch is further configured to couple the third port and the third interface based on the fourth control signal.

11. A terminal device comprising:
  a global navigation satellite system (GNSS) chip comprising:
    a first interface corresponding to a first frequency band in the GNSS chip; and
    a second interface corresponding to a second frequency band in the GNSS chip;
  an antenna configured to receive a first signal comprising a first positioning signal in the first frequency band and a second positioning signal in the second frequency band; and
  a preprocessing system comprising:
    a filter comprising:
      a first end;
      a second end; and
      a first connecting end coupled to the second interface;
    a first port comprising:
      a third end; and
      a fourth end is suspended;
    a first switch comprising:
      a fifth end coupled to the third end; and
      a sixth end coupled to the second end;
      a second connecting end coupled to the first interface,
      wherein the first switch is configured to couple the filter and the first interface; and
    a second port comprising:
      an eighth end coupled to the first end; and
      a ninth end coupled to the antenna, and
    wherein the filter is configured to:
      filter the first signal to obtain the first positioning signal and the second positioning signal;
      provide the first positioning signal to the first switch; and
      provide the second positioning signal to the second interface, and
    wherein the GNSS chip is configured to process the first positioning signal and the second positioning signal.

12. The terminal device of claim 11, wherein the first switch further comprises a seventh end, wherein the terminal device further comprises a first control system comprising a tenth end coupled to the seventh end, and wherein the first control system is configured to:
  obtain a configuration parameter;
  generate a control signal based on the configuration parameter; and
  provide the control signal to the first switch.

13. The terminal device of claim 12, wherein the first switch is further configured to couple the filter and the first interface based on the control signal.

14. The terminal device of claim 11, wherein the GNSS chip further comprises a third interface corresponding to a third frequency band in the GNSS chip, and wherein the preprocessing system further comprises:
  a third port comprising:
    an eleventh end; and
    a twelfth end suspended; and
  a second switch comprising:
    a thirteenth end coupled to a fourteenth end of the filter;
    a fifteenth end coupled to the eleventh end; and
    a third connecting end coupled to the third interface,
  wherein the second switch is configured to couple the filter and the third interface,
  wherein the antenna is configured to receive a third positioning signal in the third frequency band, and
  wherein the GNSS chip is further configured to process the first positioning signal, the second positioning signal, and the third positioning signal.

15. The terminal device of claim 14, wherein the preprocessing system further comprises a second control system, wherein the second control system comprises:
  a sixteenth end coupled to a seventeenth end of the first switch; and
  an eighteenth end coupled to a nineteenth end of the second switch,
  wherein the second control is configured to:
    obtain a configuration parameter;
    generate a control signal based on the configuration parameter; and
    provide the control signal to the first switch and the second switch,
  wherein the first switch is further configured to couple the filter and the first interface based on the control signal, and
  wherein the second switch is further configured to couple the filter and the third interface based on the control signal.

16. A terminal device comprising:
  a global navigation satellite system (GNSS) chip comprising:
    a first interface corresponding to a first frequency band in the GNSS chip; and
    a second interface corresponding to a second frequency band in the GNSS chip;
  a first antenna configured to receive a first positioning signal in the first frequency band;

a second antenna configured to receive a second signal comprising a second positioning signal in the second frequency band; and a preprocessing system comprising:
  a filter comprising:
    a first end;
    a second end; and
    a first connecting end coupled to the second interface;
  a first port comprising:
    a third end; and
    a fourth end coupled to the first antenna;
  a first switch comprising:
    a fifth end coupled to the second end;
    a sixth end coupled to the third end; and
    a second connecting end coupled to the first interface,
    wherein the first switch is configured to couple the first port and the first interface; and
  a second port comprising:
    an eighth end coupled to the first end; and
    a ninth end coupled to the second antenna,
    wherein the filter is configured to provide the second positioning signal to the second interface, wherein the GNSS chip is configured to process the first positioning signal and the second positioning signal.

17. The terminal device of claim 16, wherein the first switch further comprises a seventh end, wherein the terminal device further comprises a first control system comprising a tenth end coupled to the seventh end, and wherein the first control system is configured to:
  obtain a configuration parameter;
  generate a first control signal based on the configuration parameter; and
  provide the first control signal to the first switch, and
wherein the first switch is configured to couple the filter and the first interface based on the first control signal.

18. The terminal device of claim 17, wherein the first control system is further configured to:
  generate a second control signal based on the configuration parameter; and
  provide the second control signal to the first switch,
wherein the first switch is further configured to couple the first port and the first interface based on the second control signal.

19. The terminal device of claim 16, further comprising a third antenna, wherein the GNSS chip further comprises a third interface corresponding to a third frequency band in the GNSS chip, and wherein the preprocessing system further comprises:
  a third port comprising:
    an eleventh end; and
    a twelfth end coupled to the third antenna,
  wherein the third antenna is configured to receive a third positioning signal in the third frequency band; and
  a second switch comprising:
    a thirteenth end coupled to the eleventh end;
    a fourteenth end coupled to a fifteenth end of the filter; and
    a third connecting end coupled to the third interface,
wherein the second switch is configured to couple the third port and the third interface,
wherein the GNSS chip is further configured to process the third positioning signal.

20. The terminal device of claim 19, further comprising a second control system comprising:
  a sixteenth end coupled to a seventeenth end of the first switch; and
  an eighteenth end coupled to a nineteenth end of the second switch,
wherein the second control system is configured to:
  obtain a configuration parameter;
  generate a control signal based on the configuration parameter; and
  provide the control signal to the first switch and the second switch,
wherein the first switch is configured to couple the first port and the first interface based on the control signal, and
wherein the second switch is configured to couple the third port and the third interface based on the control signal.

* * * * *